Patented June 24, 1930

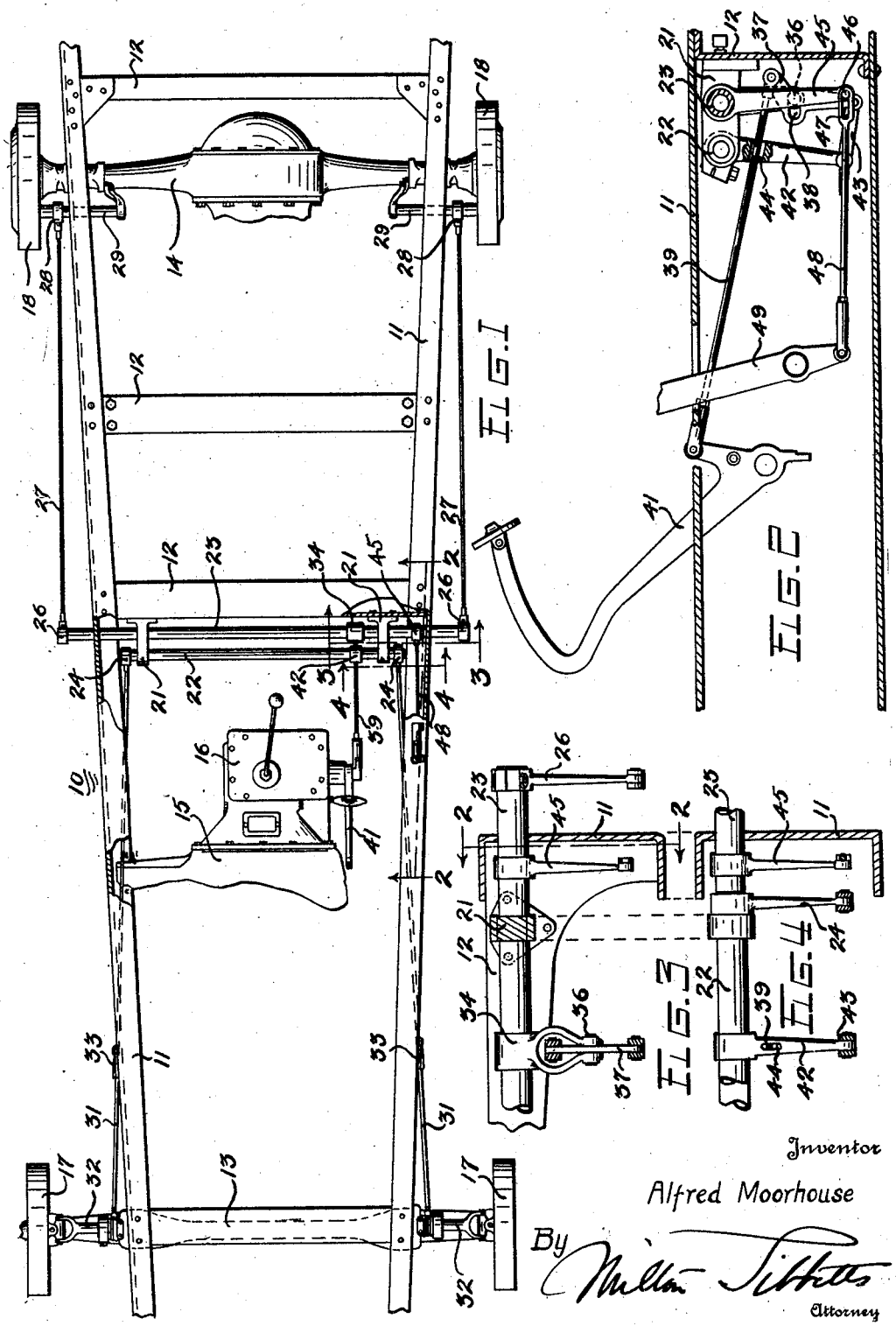

1,767,388

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

BRAKE-OPERATING MECHANISM

Application filed August 7, 1925. Serial No. 48,910.

This invention relates to motor vehicles, and more particularly to the brake mechanism thereof. It has for one of its objects to provide an operating mechanism for brakes on the four wheels of the motor vehicle, which mechanism shall be simple, reliable and efficient, and which shall be inexpensive to manufacture and easy to install.

Another object of the invention is to provide an operating mechanism for the four wheel brakes of motor vehicles in which the brakes of the front pair and the brakes of the rear pair are each connected by operating means for application without equalization, and the operating means for the respective pairs is connected for operation in a predetermined ratio.

Another object of the invention is to provide brake operating mechanism in which all four brakes are applied by one means, and the rear brakes are applied by separate means.

Other objects of the invention will appear from the following description taken in connection with the drawings, which form a part of this specification, and in which:

Fig. 1 is a fragmentary plan view of a motor vehicle chassis showing the application of this invention thereto;

Fig. 2 is a view of a portion of the apparatus shown in Fig. 1, partially in side elevation and partially in section substantially on the line 2—2 of Figs. 1 and 3, and Figs. 3 and 4 are views in section substantially on the lines 3—3 and 4—4 respectively of Figs. 1 and 2.

Referring to the drawings, at 10 is shown the chassis of a motor vehicle having a frame composed of side members 11 and cross members 12, which frame is supported upon front and rear axles 13 and 14 through springs of the usual type (not shown), the axles being in turn supported at their ends by wheels of the well known form. As these form no part of this invention, they are not illustrated. The rear axle is driven to propel the vehicle, from an engine 15, supported upon the chassis frame, through suitable transmission gearing enclosed in a housing or case 16 in the well known manner, and the ends of the front axle 13 are provided with pivoted steering spindles which may be turned to effect steering thereof. Each of the vehicle wheels is provided with a brake of any suitable construction, and in the present illustration the front brakes have been designated generally at 17, and the rear brakes at 18.

Mounted transversely of the chassis 10 in brackets 21, which may be conveniently secured to one of the cross members 12, is a pair of parallel rock shafts 22 and 23. The front shaft 22 preferably terminates inside the vehicle side frame members 11, and is provided at its ends with rigidly secured depending arms 24. The rear shaft 23 projects through the side frame members 11 and is provided at its ends with arms 26, similar to the arms 24. The arms 26 are outside the chassis frame members and are connected by tension members 27, such as cables or pull rods, to actuating levers 28 on rock shafts 29 carried by the rear axle 14, which rock shafts 29 are adapted to actuate the rear brakes 18 in the well known manner. The arms 24 are similarly connected by cables 31 to arms on rock shafts 32 by which the front brakes 17 are actuated, the cables 31 passing through apertures 33 in the side members 11. As the specific brake mechanisms operated by the rock shafts 29 and 32 respectively are not a part of this invention, it is not necessary to describe them further, but it is to be understood that any suitable brake mechanism may be employed.

Rigidly secured to the rock shaft 23 at a point intermediate its ends and between the side members 11 is a bifurcated arm 34, the lower ends of the branches of which support a pivot pin 36, upon which a floating lever 37 is pivotally mounted. This lever 37 is formed with a slot 38 through which the pin 36 passes and on which the lever is fulcrumed. The upper end of the lever 37 is pivotally connected to a forwardly extending rod 39 which extends to the brake pedal lever 41 and which is operated thereby. The pedal lever may be conveniently mounted on the gear case 16 in the usual way.

The shaft 22 is provided with a rigidly clamped arm 42, preferably arranged in line with the arm 34, and the lower end of this arm is connected to the lower end of the floating lever 37 by a link 43 through a suitable pivoted connection such as the pin and clevis shown. The arm 42 is provided with a suitable slot 44 for passage of the brake rod 39.

The shaft 23 is also provided with an arm 45, preferably located just inside the left hand side member 11, the lower end of which arm is connected by any suitable lost motion device, such as a pin 46 and slot 47, with a pull rod 48. The forward end of this pull rod is attached to and adapted for operation by the hand brake lever 49, which is conveniently mounted on the side member 11.

The operation of this invention will be apparent from the above description. When the brake pedal lever 41 is depressed by the operator of the vehicle, a pull is exerted on the upper end of the floating lever 37 which causes a pressure in a forward direction to be exerted on the pin 36 on the arm 34, thus tending to rock the shaft 23 in a clock-wise direction. The lower end of the floating lever 37 tends to move toward the rear of the vehicle and this force is transmitted through the link 43 to the lower end of the arm 42, thus tending to rock the shaft 22 in a counter clock-wise direction. The motion of the shaft 22 swings the lower ends of the arms 24 toward the rear of the vehicle and the motion of the shaft 23 swings the lower ends of the arms 26 toward the front of the vehicle, and this movement is communicated through the cables 27 and 31 to the rear brakes 18 and the front brakes 17 respectively, the tension on the front brake cables and the rear brake cables being proportioned in accordance with the position of the pivot pin 36 on the arm 34. It is obvious that by changing the position of the pivot along the length of the arm 34, any desired ratio of braking effect between the front brakes and the rear brakes may be secured.

It is to be noted that the connections above described do not equalize the force of the brake application as between the two brakes 17 of the front pair or between the two brakes 18 of the rear pair, the floating lever 37 functioning only to proportion the angular movements of the rock shafts 22 and 23 and thereby to determine the relative braking effect as between the front and rear pairs of brakes. This proportioning of the braking effect is ordinarily arranged so as to exert a heavier braking effect on the rear brakes 18 than on the front brakes 17, but equal braking, or any desired proportion may be provided.

Movement of the hand brake lever 49 is communicated through the pull rod 48 to the arm 34, thus turning the rear rock shaft 23 only. The use of this hand brake, therefore, applies brakes to the rear wheels of the vehicle only, the front brakes not being operated. During application of all the brakes by the pedal lever 41, the pin 46 at the lower end of the arm 34 travels forwardly in the slot 47 so that the hand brake lever mechanism is not disturbed in any way. In the same manner, during movement of the hand brake lever 49, the pin 36 travels forwardly in the slot 38 as the arm 34 is moved, so that the brake pedal connections are not disturbed. The two mechanisms are therefore entirely separate and may be operated independently by the driver of the vehicle.

It will be apparent that this invention provides a simple and efficient brake mechanism, having a minimum of parts, by which the braking effect is proportioned between the front and rear pairs of brakes, and in which separate hand and foot brake levers are provided without the unnecessary duplication of parts. By reason of the simplicity of the mechanism a reliable braking mechanism is provided, the manufacturing cost of which is not excessive, which is readily installed, and which is accessible for adjustment and repair.

It will be understood that various forms of the invention other than those described above may be used without departing from the spirit or scope of the invention.

What is claimed is:

1. The combination in a motor vehicle having front and rear brakes, of a front rock shaft to operate the front brakes, a rear rock shaft to operate the rear brakes, means to operate all said brakes including an arm on the rear rock shaft, a floating lever on the arm, an operating lever connected to one end to the floating lever and the other end of the floating lever connected to the front rock shaft, and a separate operating lever independently connected to the rear rock shaft.

2. The combination in a motor vehicle having front and rear brakes, of a front rock shaft having rigidly secured arms to operate the front brakes, a rear rock shaft having rigidly secured arms to operate the rear brakes, a lever so fulcrumed on one of the shafts that the shaft may be rocked without moving the lever, means to operate all said brakes together through said lever, and means to independently actuate the rear rock shaft to operate the rear brakes separately.

3. The combination in a motor vehicle having front and rear brakes, front and rear rock shafts each having a pair of rigidly secured arms, an independent connection from each said arm to operate the corresponding brake, a linkage connection between the rock shafts including adjacent arms rigidly secured to the rock shafts, a floating lever fulcrumed on one of the adjacent arms and connected at one end to the other arm, and operating means connected to the other end of the floating lever.

4. The combination in a motor vehicle having front and rear brakes, of a pair of parallel rock shafts each having rigid arms connected to operate the respective brakes, means to operate all said brakes including a floating lever having an over running connection at its fulcrum to one of the shafts, the lever being connected at one end to the other shaft and at the other end to the operating means.

5. The combination in a motor vehicle having front and rear brakes, of a pair of parallel rock shafts disposed transversely of the vehicle, arms rigidly secured to each of the shafts adjacent the ends thereof, a connection from each of the arms to one of the brakes, a brake pedal lever and means for operably connecting said pedal lever to the brakes including adjacent arms on the shafts, a floating lever fulcrumed on one of the arms, and connected at one end to one of the arms and at the other end to the said pedal lever.

6. A brake mechanism for motor vehicles having four wheel brakes, comprising a rock shaft connected to operate the front brakes, a rock shaft connected to operate the rear brakes, adjacent arms on said shafts, a floating lever fulcrumed on one of said arms and connected at one end to the other arm, and operating means connected to the other end of the floating lever.

7. A brake mechanism for motor vehicles having four wheel brakes, comprising a rock shaft connected to operate the front brakes, a rock shaft connected to operate the rear brakes, adjacent arms on said shaft, a floating lever fulcrumed on one of said arms and connected at its lower end to the other arm to oscillate the shafts in opposite directions, and operating means connected to the upper end of the floating lever.

8. A brake mechanism for motor vehicles having front and rear brakes, comprising a pair of parallel rock shafts each adapted to operate one of the pairs of brakes, and means to oscillate both rock shafts in opposite directions, comprising a floating lever carried by one of the shafts and connected at one end to the other shaft and an operating lever connected to the other end of the floating lever, and means to oscillate one shaft to apply one of said pairs of brakes comprising an operating lever and a lost motion connection to the said shaft.

9. The combination in a motor vehicle having front and rear pairs of brakes, of a pair of parallel rock shafts each having rigid arms connected to operate one of the pairs of brakes, and means for rotating the rock shafts to apply the pairs of brakes with different pressures including an angularly disposed floating lever, the initial angular position of said lever determining the pressures exerted by the pairs of brakes when operated.

10. The combination in a motor vehicle having front and rear pairs of brakes, of a pair of parallel rock shafts disposed transversely of the vehicle, connections between one of said shafts and the front pair of brakes, connections between the other of said shafts and the rear pair of brakes, an arm extending from each shaft, a floating lever angularly disposed with respect to said arms, a link between one end of the lever and one of the arms, an over-running connection between an intermediate portion of the lever and the other of the arms, the initial angular relation of said floating lever relative to the arms determining the degree of the rotation of said shafts, and means for actuating said lever.

In testimony whereof I affix my signature.

ALFRED MOORHOUSE.